US009350832B2

(12) United States Patent
Horii

(10) Patent No.: US 9,350,832 B2
(45) Date of Patent: May 24, 2016

(54) MOBILE ELECTRONIC DEVICE

(71) Applicant: KYOCERA Corporation, Kyoto (JP)

(72) Inventor: Seiji Horii, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 63 days.

(21) Appl. No.: 14/348,424

(22) PCT Filed: Sep. 26, 2012

(86) PCT No.: PCT/JP2012/074760

§ 371 (c)(1),
(2) Date: Mar. 28, 2014

(87) PCT Pub. No.: WO2013/047609

PCT Pub. Date: Apr. 4, 2013

(65) Prior Publication Data

US 2015/0256656 A1 Sep. 10, 2015

(30) Foreign Application Priority Data

Sep. 30, 2011 (JP) ................................ 2011-218486
Mar. 29, 2012 (JP) ................................ 2012-077674

(51) Int. Cl.
*H04M 1/23* (2006.01)
*H04M 1/02* (2006.01)
*H04M 1/03* (2006.01)

(52) U.S. Cl.
CPC .............. *H04M 1/0202* (2013.01); *H04M 1/03* (2013.01); *H04M 1/0283* (2013.01); *H04M 2250/22* (2013.01)

(58) Field of Classification Search
CPC ........ H04M 1/23; H04M 1/0247; H04M 1/05
USPC ............... 455/575.1, 575.6, 90.3, 575.2, 128, 455/414.1, 566; 310/324, 311
See application file for complete search history.

(56) References Cited

U.S. PATENT DOCUMENTS

| | | | | |
|---|---|---|---|---|
| 4,766,671 | A | 8/1988 | Utsumi et al. | |
| 6,420,818 | B1 | 7/2002 | Kishimoto et al. | |
| 2006/0044279 | A1 | 3/2006 | Nasu et al. | |
| 2008/0281238 | A1* | 11/2008 | Oohashi et al. | 601/46 |
| 2010/0040249 | A1* | 2/2010 | Lenhardt | 381/316 |
| 2011/0319021 | A1* | 12/2011 | Proulx et al. | 455/41.2 |
| 2013/0281152 | A1* | 10/2013 | Nishimura | 455/550.1 |
| 2013/0308798 | A1 | 11/2013 | Lee | |

(Continued)

FOREIGN PATENT DOCUMENTS

| | | | |
|---|---|---|---|
| EP | 1542064 | A1 | 6/2005 |
| JP | 62-132500 | A | 6/1987 |

(Continued)

OTHER PUBLICATIONS

Office Action mailed Sep. 2, 2014, corresponding to Japanese patent application No. 2013-536363.

(Continued)

*Primary Examiner* — Minh D Dao
(74) *Attorney, Agent, or Firm* — Hauptman Ham, LLP

(57) ABSTRACT

According to an aspect, a mobile electronic device includes: a housing; and a piezoelectric element. The piezoelectric element vibrates a portion in contact with a user in the mobile electronic device and transmits vibration sound to the user.

15 Claims, 11 Drawing Sheets

(56) References Cited

U.S. PATENT DOCUMENTS

| | | | | |
|---|---|---|---|---|
| 2013/0335211 | A1* | 12/2013 | Kobayashi | 340/407.2 |
| 2015/0181338 | A1* | 6/2015 | Hosoi et al. | 381/309 |

FOREIGN PATENT DOCUMENTS

| | | | |
|---|---|---|---|
| JP | 2000-312398 | A | 11/2000 |
| JP | 2003-145048 | A | 5/2003 |
| JP | 2004-187031 | A | 7/2004 |
| JP | 2004-336403 | A | 11/2004 |
| JP | 2005-236352 | A | 9/2005 |
| JP | 2005-348193 | A | 12/2005 |
| JP | 2006-065611 | A | 3/2006 |
| JP | 2007-189578 | A | 7/2007 |
| JP | 2008-148086 | A | 6/2008 |
| JP | 2010-162508 | A | 7/2010 |
| JP | 2011-53744 | A | 3/2011 |
| KR | 10-1068254 | B1 | 9/2011 |

OTHER PUBLICATIONS

International Search Report mailed Dec. 11, 2012, in corresponding International Application No. PCT/JP2012/074760.

Extended European Search Report dated Jul. 7, 2015, corresponding to European patent application No. 12836082.3.

* cited by examiner

MOBILE ELECTRONIC DEVICE

CROSS-REFERENCE TO RELATED APPLICATION

This application is a National Stage of International Application No. PCT/JP2012/074760 filed on Sep. 26, 2012, and is based upon and claims priority from Japanese Patent Application No. 2011-218486 filed on Sep. 30, 2011, and Japanese Patent Application No. 2012-077674 filed on Mar. 29, 2012.

FIELD

The present disclosure relates to a mobile electronic device. More particularly, the present disclosure relates to a mobile electronic device that applies a predetermined electrical signal (sound signal) to a piezoelectric element to vibrate a panel and transmits the vibration of the panel to a human body, thus transmitting vibration sound to a user.

BACKGROUND

Patent Literature 1 describes a device, as an electronic device such as a mobile phone, that transmits air-conducted sound and bone-conducted sound to a user. Patent Literature 1 also describes that the air-conducted sound is sound transmitted to the auditory nerve of the user in such a manner that vibration of air caused by vibration of an object is transmitted to an eardrum through an ear canal to vibrate the eardrum. In addition, Patent Literature 1 describes that the bone-conducted sound (vibration sound) is sound transmitted to the auditory nerve of the user via part of a user's body (e.g., external ear cartilage) in contact with a vibrating object.

Patent Literature 2 describes a speaker known as one that transmits sound to a human body by vibration sound. The speaker transmits the vibration generated by a piezoelectric element arranged in a case to a user via a contact for transmitting vibration energy and via a contact pad that is attached to the case and comes in contact with, for example, cartilage around a user's ear.

CITATION LIST

Patent Literature

Patent Literature 1: Japanese Patent Application Laid-open No. 2005-348193

Patent Literature 2: Japanese Patent Application Laid-open No. 2008-148086

Technical Problem

Incidentally, when the piezoelectric element as described in Patent Literature 1 and Patent Literature 2 is used as a sound output unit of a mobile electronic device such as a mobile phone, a positional relation between the piezoelectric element and the other components arranged in the mobile electronic device, and the like, is preferably considered to appropriately transmit sound to the user.

For the foregoing reasons, there is a need for a mobile electronic device capable of appropriately transmitting vibration sound to the user.

SUMMARY

According to an aspect, a mobile electronic device includes: a housing; and a piezoelectric element. The piezoelectric element vibrates a portion in contact with a user in the mobile electronic device and transmits vibration sound to the user.

According to another aspect, the mobile electronic device may be configured such that the housing has an opening formed therein, the mobile electronic device further includes: a cover member fitted in the opening; and a display unit arranged inside of the housing so that a display area is visible from outside of the housing through the cover member, and the piezoelectric element is attached to the cover member.

According to another aspect, the mobile electronic device may further include a touch panel laminated between the cover member and the display unit.

According to another aspect, the mobile electronic device may be configured such that the housing has an opening formed therein, the mobile electronic device further includes a display unit arranged inside of the housing so that a display area is visible from outside of the housing through the opening, and the piezoelectric element is attached to the display unit.

According to another aspect, the mobile electronic device may further include a touch panel that faces the display area of the display unit and is laminated on an outer side thereof in the housing.

According to another aspect, the mobile electronic device may be configured such that the housing has an opening formed therein, the mobile electronic device further includes a decorative member that is extended from inside of the housing to outside of the housing through the opening, and the piezoelectric element is attached to the decorative member.

According to another aspect, the mobile electronic device may be configured such that he piezoelectric element is fixed to an inner face of the housing.

According to another aspect, the mobile electronic device may be configured such that the housing has a substantially rectangular flat plate portion, and the piezoelectric element is a bar shape, and is arranged so that a long-side direction thereof is along a short-side direction of the flat plate portion and so that a center thereof in the long-side direction coincides with a center in the short-side direction of the flat plate portion.

According to another aspect, the mobile electronic device may be configured such that a circuit substrate is arranged inside of the housing, and the circuit substrate is a multilayer substrate that includes an electrode layer inside of the circuit substrate, the piezoelectric element is provided inside of the multilayer substrate, and the electrode layer is electrically coupled to the piezoelectric element.

According to another aspect, the mobile electronic device may be configured such that at least part of the piezoelectric element is embedded in the housing.

According to another aspect, the mobile electronic device may be configured such that the housing is formed of resin, and the piezoelectric element is embedded in the housing by insert molding.

According to another aspect, the mobile electronic device may be configured such that the housing has an opening formed therein, the piezoelectric element is arranged near the opening, and a first sound transmitted from the vibrating housing to the user and a second sound that is sound generated by the vibration of the piezoelectric element and is transmitted to the user through the opening are cancelled each other in a proportion according to a frequency band.

According to another aspect, the mobile electronic device may be configured such that the housing has an opening formed therein, and at least part of a frequency component of a first sound generated in a portion of the housing vibrated by the piezoelectric element in contact with the user is reduced by a second sound generated inside of the housing by the vibration of the piezoelectric element and output from the opening.

According to another aspect, the mobile electronic device may be configured such that an area where, upon contact with a body of the user, the vibration can be transmitted to the body is same as an ear of the user or is larger than the ear.

According to another aspect, a mobile electronic device includes: a housing; and a piezoelectric element. The piezoelectric element vibrates a portion in contact with a user in the mobile electronic device and transmits air-conducted sound and vibration sound to the user.

Advantageous Effects of Invention

According to one aspect of the present invention, it is possible to provide a mobile electronic device capable of appropriately transmitting the sound to the user by vibration sound.

DESCRIPTION OF EMBODIMENTS

First Embodiment

A mobile phone being an example of a mobile electronic device according to a first embodiment of the present invention will be explained in detail below with reference to the accompanying drawings. The present invention, however, is not limited by the following explanation. In addition, the components in the explanation below include those which can be easily conceived by persons skilled in the art, those which are substantially identical thereto, and those which are in a scope of so-called equivalents. In the following, a mobile phone is explained as an example of the mobile electronic device; however, a target to which the present invention is applied is not limited to the mobile phone. Therefore, the present invention can be applied to various mobile electronic devices having a function to allow a user to listen to sound by bringing the housing thereof close to his/her ear, such as PHS (Personal Handy-phone System), PDA, and gaming devices.

Figure 1:
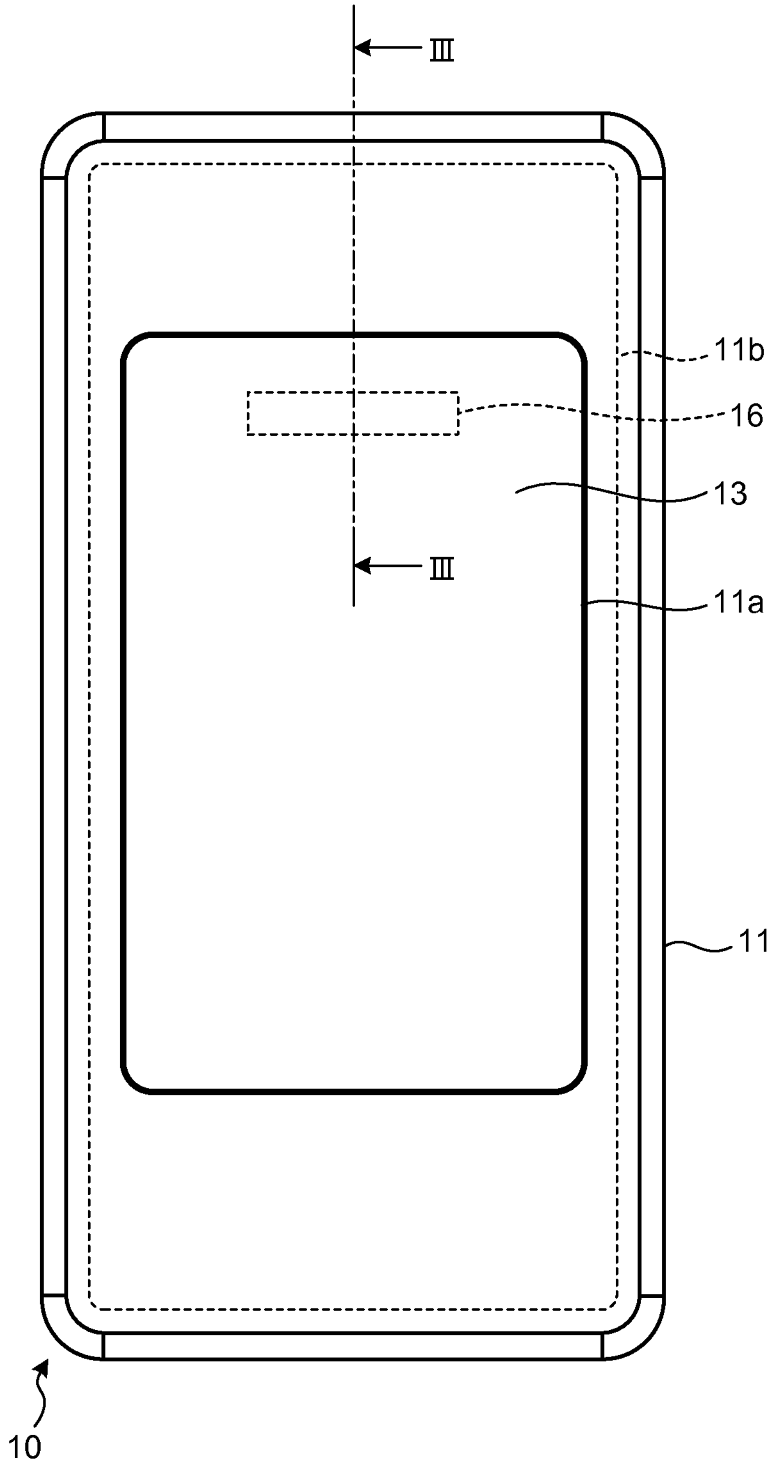
FIG. 1 is a front view of a mobile phone according to a first embodiment.
Figure 2:
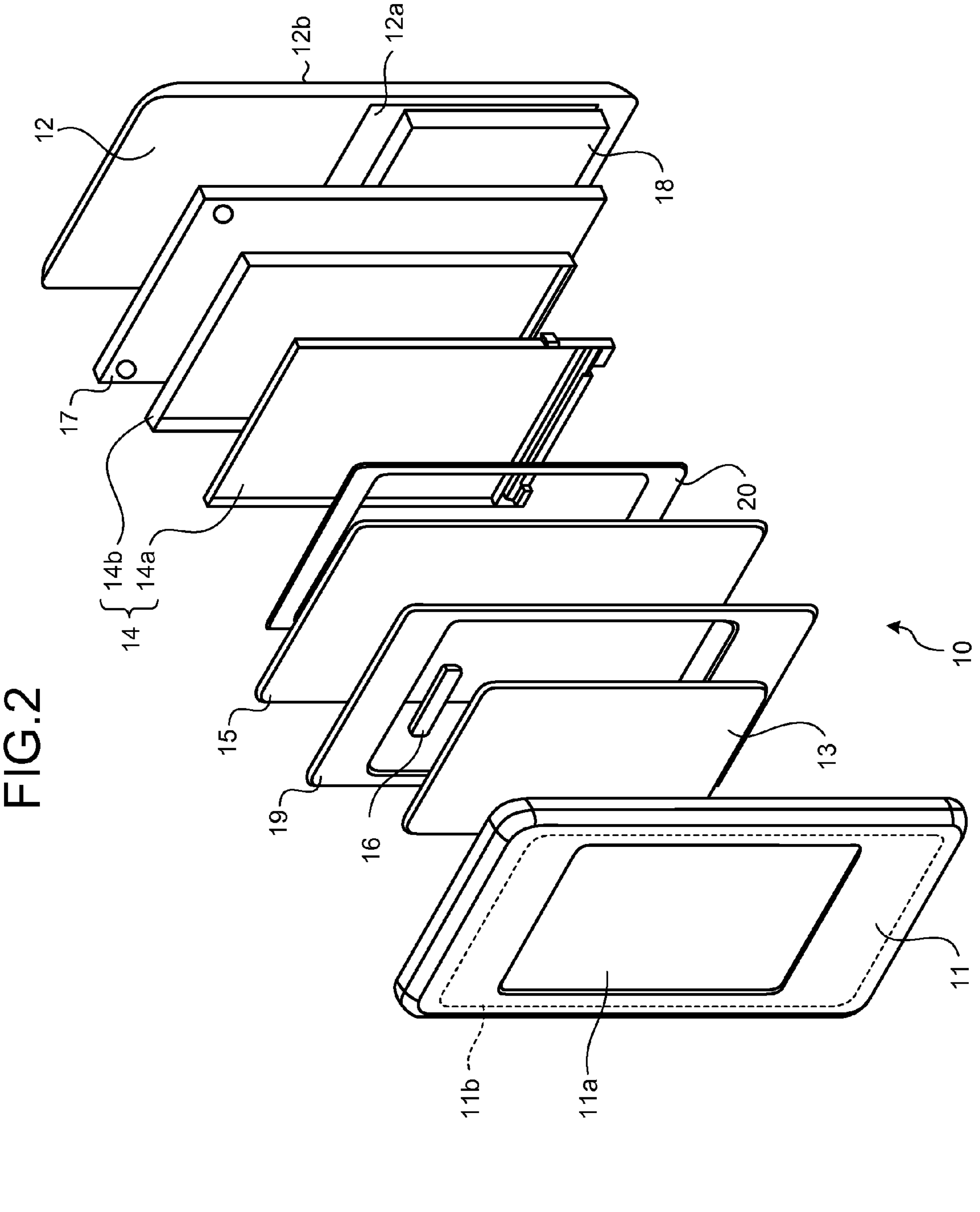
FIG. 2 is an exploded perspective view of the mobile phone according to the first embodiment.

FIG. 1 is a front view of the mobile phone according to the first embodiment. FIG. 2 is an exploded perspective view of the mobile phone according to the first embodiment. A mobile phone 10 includes a front case 11 (housing) and a rear case 12 (housing) provided outside thereof, and the front case 11 and the rear case 12 form a housing unit.

The front case 11 is formed by molding resin, for example. The front case 11 has a flat plate portion 11*b* which is substantially rectangular. The front case 11 has four side faces, in four sides of the flat plate portion 11*b*, which are arranged perpendicularly to the flat plate portion 11*b*. The front case 11 has an opening 11*a* formed in substantially center of the flat plate portion 11*b*.

The rear case 12 is formed by molding resin, for example. The rear case 12 has, similar to the front case 11, a flat plate portion 12*b* which is substantially rectangular. Similar to the front case 11, the rear case 12 has four side faces, in the four sides of the flat plate portion 12*b*, which are arranged perpendicularly to the flat plate portion 12*b*. The rear case 12 has an opening for battery storage formed in part of the flat plate portion 12*b*. A battery cover 12*a* is fitted in the opening for battery storage.

A cover glass 13 is a transparent plate formed of glass. The cover glass 13 is arranged in the opening 11*a* of the front case 11. A surface in the external side of the cover glass 13 is made flush with an outer surface of the flat plate portion 11*b*. The mobile phone 10 according to the present embodiment is provided with the cover glass 13 as a cover member for covering the opening 11*a*; however, the embodiment is not limited thereto. The cover member has only to be a transparent plate member, and therefore a transparent plate member made of, for example, plastic may be used.

The front case 11, the rear case 12, the battery cover 12*a*, and the cover glass 13 form the outer surface of the mobile phone 10.

Figure 3:
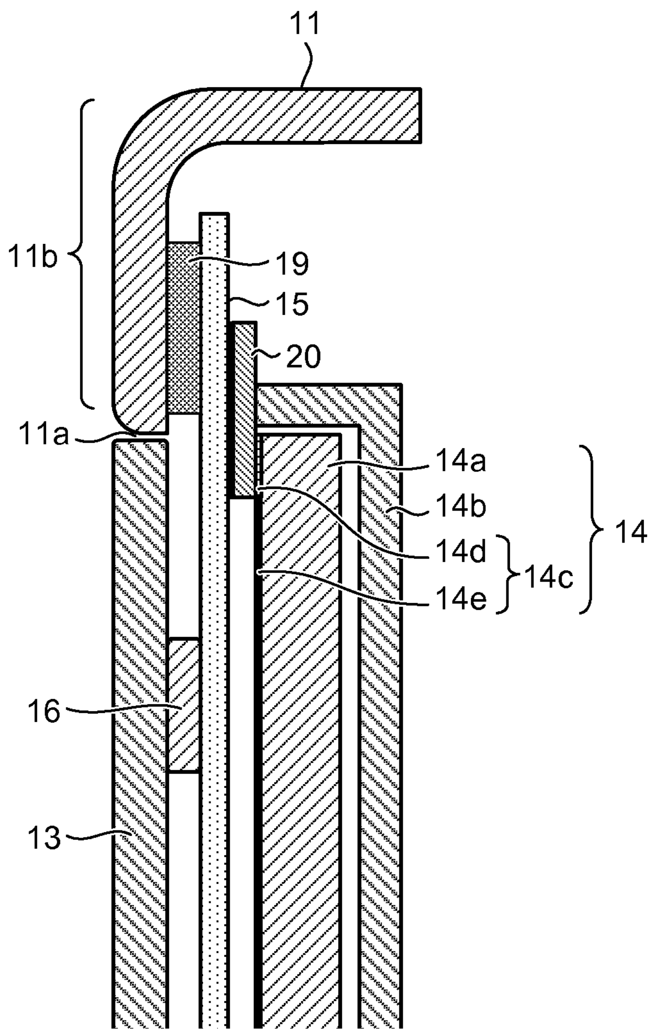
FIG. 3 is a cross-sectional view of the mobile phone according to the first embodiment in a III-III direction in FIG. 1.

FIG. 3 is a cross-sectional view of the mobile phone according to the first embodiment in a III-III direction in FIG. 1. A positional relation among the components forming the mobile phone 10 will be explained below with reference to FIG. 2 and FIG. 3.

The mobile phone 10 includes an elastic member 19 and a piezoelectric element 16, a touch sensor 15, a double-sided tape 20, a display unit 14, a substrate 17, a battery 18, and the rear case 12, which are arranged inside the housing unit in this order along a thickness direction from the cover glass 13 to the inside of the housing unit (a direction from the front side to the back side in FIG. 1, hereinafter, called "lamination direction"). The components will be explained in detail below.

The touch sensor 15 is a type of operation input units that detect an operation externally input to an operation surface on the outside of the housing. Specifically, the touch sensor 15 has a substantially plate-shaped operation surface (contact surface) with a given area. When an external object comes into contact with part of the contact surface, the touch sensor 15 transmits a predetermined electrical signal corresponding to a position where the external object is in contact with the contact surface to a control unit of the mobile phone 10.

More specifically, the touch sensor 15 has a transparent conductive film. When contacted by the external object such as a human finger, the touch sensor 15 detects a change in capacitance between the conductive film and the external object. The touch sensor 15 detects which part of the contact surface is contacted by the external object based on the detection of the change in capacitance, and transmits the predetermined electrical signal indicating the position where the external object is in contact therewith to the control unit (capacitive system).

When the capacitive system is adopted, the contact surface of the touch sensor 15 does not need to be directly contacted by the external object. Therefore, even if the cover glass 13 is sandwiched between the contact surface and the external object as in the present embodiment, the touch sensor detects the contact of the external object. The touch sensor 15 is laminated on the external side of the housing unit in opposite to a display area 14*e* side of the display unit 14, and is thereby exposed from the housing unit.

Moreover, the touch sensor 15 is directly fixed to the cover glass 13. The elastic member 19 is arranged between the touch sensor 15 and the front case 11. The display unit 14 is arranged on the housing inner side of the touch sensor 15. The display unit 14 and the touch sensor 15 are adhered to each other by the double-sided tape 20.

The display unit 14 displays information on the outside of the housing unit via the cover glass 13 and the touch sensor 15. The display unit 14 includes a display device 14*a* and a metal frame 14*b*. The display unit 14 has a flat plate shape.

The display device 14*a* is formed of LCD (Liquid Crystal Display), OEL (Organic Electro-Luminescence), or so, and has a display surface 14*c* for displaying various pieces of information. A portion other than the display surface 14*c* of the display device 14*a* is surrounded by the metal frame 14*b*. The metal frame 14*b* has functions of holding the display device 14*a* and protecting it from external shock by surrounding the portion other than the display surface 14*c* of the display device 14*a*.

The display unit 14 has a non-display area 14*d* and the display area 14*e* on the display surface 14*c*. The non-display area 14*d* is an area around an outer periphery of the display surface 14*c*. The display area 14*e* is an area other than the non-display area 14*d*, which is adjacent to the non-display area 14*d*, within an area of the display surface 14*c*. The display unit 14 is arranged inside the housing unit such that the display area 14*e* can be viewed from the outside of the housing unit through the opening 11*a*.

The piezoelectric element 16 is arranged on the side of touch sensor 15 in the opposite to the display unit 14. The piezoelectric element 16 will be explained in detail later.

The substrate 17 is a substantially flat-plate shaped component having various semiconductor chips 17*a* such as a control unit provided on its surface. The substrate 17 is arranged inside the housing unit between the display unit 14 and the battery 18 in the lamination direction. Screw holes are formed on four corners of the substrate 17. The substrate 17 is fixed to the rear case 12 by inserting screws or pins into the screw holes. Specifically, the substrate 17 is fixed to ribs (not illustrated) provided on the rear case 12 using the screws or the pins.

The battery 18 is a component that supplies a power to components such as the control unit, the touch sensor 15, and the piezoelectric element 16. The battery 18 is arranged inside the housing unit between the battery cover 12*a* and the substrate 17. The battery cover 12*a* is arranged on the outside of the housing unit so as to cover the opening formed in the rear case 12. The battery cover 12*a* is removable by the user. The battery 18 is arranged at a position where it is exposed to the outside when the battery cover 12*a* is removed from the rear case 12. Therefore, when the battery cover 12*a* is removed, the user can attach or remove the battery 18.

The piezoelectric element 16 according to the present embodiment will be explained in detail below with reference to FIG. 1 to FIG. 3.

The piezoelectric element 16 has piezo ceramics (piezoelectric element). The piezoelectric element 16 is a receiver using mechanical natural resonance phenomenon of the piezo ceramics, and is provided on the housing inner side of the cover glass 13. The piezoelectric element 16 is a bar shape (e.g., width 3 mm, length 25 mm, thickness 0.5 mm). As illustrated in FIG. 1, the piezoelectric element 16 is arranged in a direction in which its long-side direction is along a short-side direction of the cover glass 13 (the short-side direction of the front case 11), The piezoelectric element 16 is arranged on the upper side with respect to the center of the long-side direction of the cover glass 13 (the long-side direction of the front case 11). In addition, the piezoelectric element. 16 is provided symmetrically with respect to an imaginary line line in FIG. 1) being parallel to the long-side direction of the front case 11 and passing through the center in the short-side direction of the front case 11.

The piezoelectric element 16 transmits the vibration of the piezoelectric element generated by using the mechanical natural resonance phenomena to the cover glass 13 to vibrate the cover glass 13. The piezoelectric element 16 is a sound output unit that transmits vibration sound to the user by vibrating part of the mobile phone 10 (the cover glass 13 in the present embodiment) to be in contact with the user. In other words, the piezoelectric element 16 transmits the sound transmitted by the vibration to the human body, to allow the user to listen to the sound and music. The sound transmitted by the vibration to the human body mentioned here is based on a system of transmission of sound to the user by transmitting the vibration to portions in contact between the piezoelectric element 16 and the human body, specifically, ear cartilage or the like and by vibrating the user body, particularly, cartilage and the like around the ear. Thus, when the user brings part of the cover glass 13 into contact with the cartilage near the ear, the vibration generated by the piezoelectric element 16 is transmitted to the user through the human body, for example, the ear cartilage via the cover glass 13, so that the user can listen to the sound output from the mobile phone 10.

The piezoelectric element 16 may be a fine and thin bar-like member, and therefore it is suitable for implementation thereof into the inner side of the mobile phone 10 such as the cover glass 13. In the first embodiment, based on the structure in which the piezoelectric element 16 is provided to the cover glass 13, the vibration generated by the piezoelectric element 16 is transmitted to the user via only the cover glass 13. Thus, an amount in which the vibration generated by the piezoelectric element 16 is damped before it is transmitted to the cartilage near the ear of the user can be reduced, which enables efficient transmission of the vibration.

In the first embodiment, the piezoelectric element 16 is provided to the cover glass 13, and therefore, as compared with a case where the piezoelectric element 16 is provided on the housing inner side of the flat plate portion 11*b* or the like, a space inside the housing can be reduced, which enables reduction in size of the mobile phone 10. Alternatively, for example, as compared with the case where the piezoelectric element 16 is provided on the housing inner side of the flat plate portion 11*b*, any other member can be arranged in the space on the housing inner side of the flat plate portion 11*b*, which enables effective use of the space inside the housing.

In the first embodiment, the piezoelectric element 16 is provided to the cover glass 13, and therefore, for example, when built therein, the piezoelectric element 16 can be also provided on the cover glass 13 in the process of fixing the display unit 14 and the touch sensor 15 to the cover glass 13, which enables achievement of high efficiency of the built-in operation.

In the first embodiment, the piezoelectric element 16 is arranged on the upper side with respect to the center of the long-side direction of the cover glass 13 (long-side direction of the front case 11). This position is near a position where a dynamic spear is generally arranged in the mobile phone having the same structure as that of FIG. 1 and with the dynamic speaker. Therefore, when the user listens to sound on the mobile phone 10, the user has only to press the ear on the same position as the case when the user listens to sound on a mobile phone with the dynamic speaker. This enables the user to listen to the sound on the mobile phone 10 without any discomfort.

In the first embodiment, the piezoelectric element 16 is arranged symmetrically with respect to the imaginary line passing through the center in the short-side direction of the front case 11, and the vibration generated from the piezoelectric element 16 is thereby transmitted uniformly to the cover glass 13. Thus, it is possible to suppress the variation in vibration to be transmitted to the user between cases where the user presses the cartilage near the ear on the left side of the cover glass 13 and where the user presses the cartilage on the right side thereof.

Second Embodiment

Figure 4:
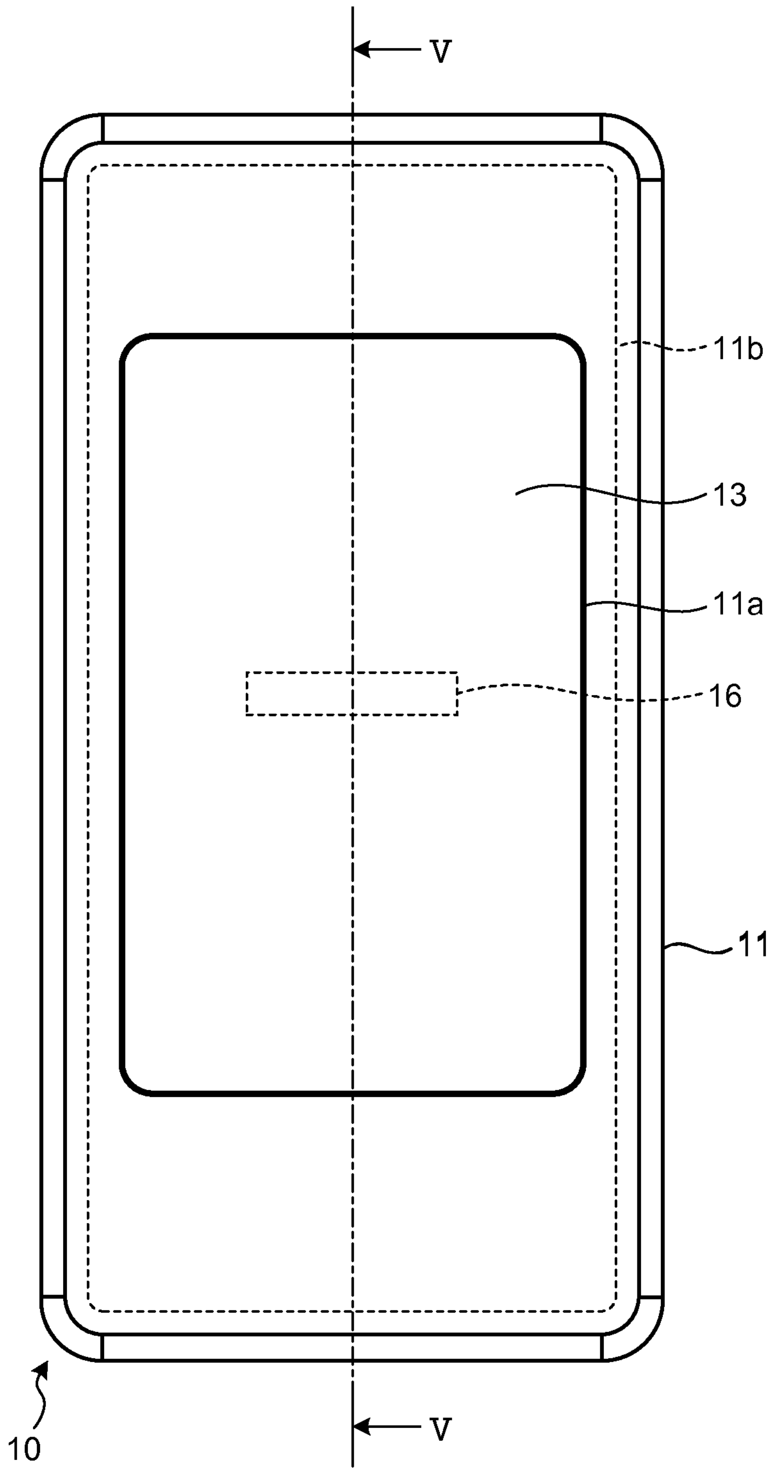
FIG. 4 is a front view of a mobile phone according to a second embodiment.
Figure 5:
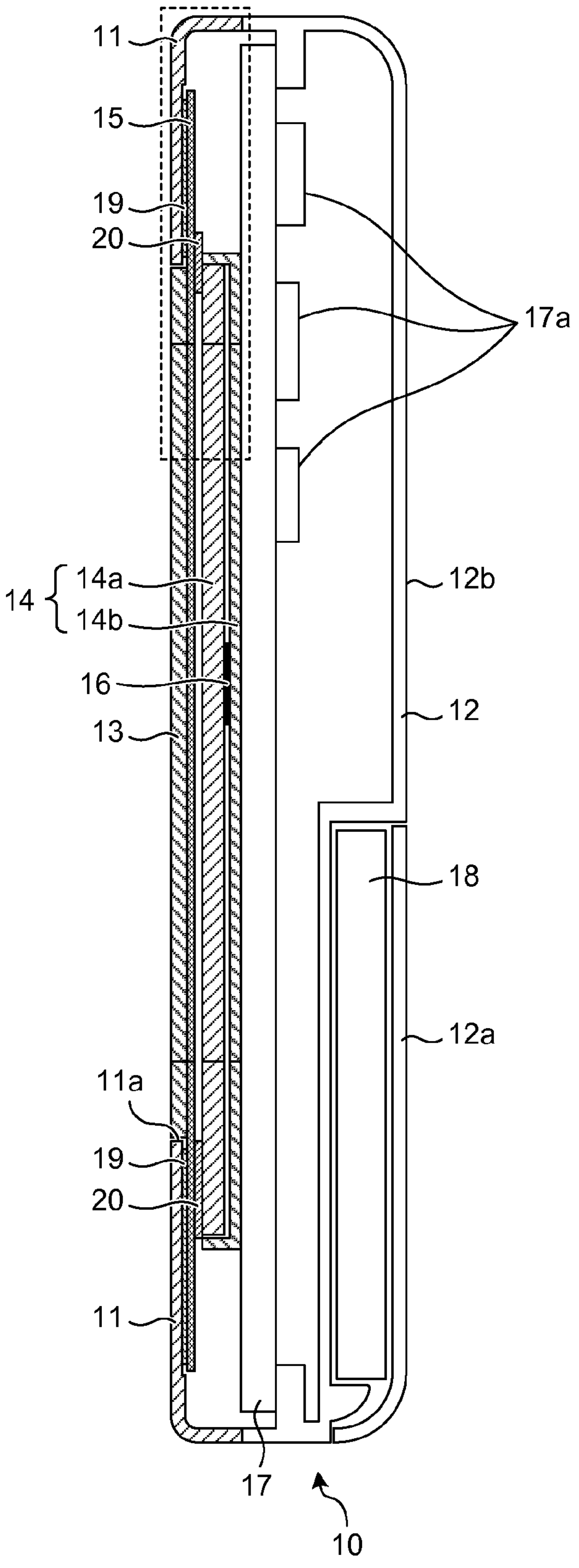
FIG. 5 is a cross-sectional view of the mobile phone according to the second embodiment in a V-V direction in FIG. 4.

The mobile phone 10 according to a second embodiment of the present invention will be explained below with reference to FIG. 4 and FIG. 5. FIG. 4 is a front view of a mobile phone according to the second embodiment. FIG. 5 is a cross-sectional view of the mobile phone according to the second embodiment in a V-V direction in FIG. 4. Hereinafter, explanation of the same portions as these of the first embodiment is omitted, and only portions different from the first embodiment will therefore be explained below.

As illustrated in FIG. 5, in the second embodiment, the piezoelectric element 16 is provided on the side of the display device 14*a* in the opposite to the touch sensor 15. The piezoelectric element 16 may be in contact with the metal frame 14*b* or does not have to be in contact therewith.

As illustrated in FIG. 4, the piezoelectric element 16 is arranged in a direction in which its long-side direction is along the short-side direction of the front case 11. As illustrated in FIG. 4, the piezoelectric element 16 is provided symmetrically with respect to an imaginary line (V-V line in FIG. 4) being parallel to the long-side direction of the front case 11 and passing through the center in the short-side direction of the front case 11. In addition, as illustrated in FIG. 4, the piezoelectric element 16 is provided symmetrically with respect to an imaginary line being parallel to the short-side direction of the front case 11 and passing through the center in the long-side direction of the front case 11.

Thus, in the second embodiment, because the piezoelectric element 16 is provided to the display device 14*a* (display unit 14), the vibration generated by the piezoelectric element 16 is transmitted over a wide range of the mobile phone 10 is the display unit 14, the touch sensor 15 in contact with the display unit 14, and the cover glass 13. This enables the user to recognize the sound even if the cartilage near the ear is pressed on various positions in the cover glass 13 and the front case 11.

In the second embodiment, because the piezoelectric element 16 is provided to the display device 14*a* (display unit 14), the space inside of the housing can be reduced as compared with, for example, the case where the piezoelectric element 16 is provided on the housing inner side of the flat plate portion 11*b* or the case where it is provided on the housing inner side of the cover glass 13, which leads to reduction in size of the mobile phone 10. Alternatively, for example, as compared with the case where the piezoelectric element 16 is provided on the housing inner side of the flat plate portion 11*b* or the case where it is provided on the housing inner side of the cover glass 13, any other member can be arranged in the space on the housing inner side of the flat plate portion 11*b*, which enables effective use of the space inside the housing.

In the second embodiment, the piezoelectric element 16 is arranged symmetrically with respect to the imaginary line passing through the center in the long-side direction or the short-side direction of the front case 11, the vibration generated from the piezoelectric element 16 is thereby transmitted uniformly to the cover glass 13, so that it is possible to reduce the variation in the vibration between the cases where the user presses the cartilage near the ear on a plurality of positions of the cover glass 13.

Third Embodiment

Figure 6:
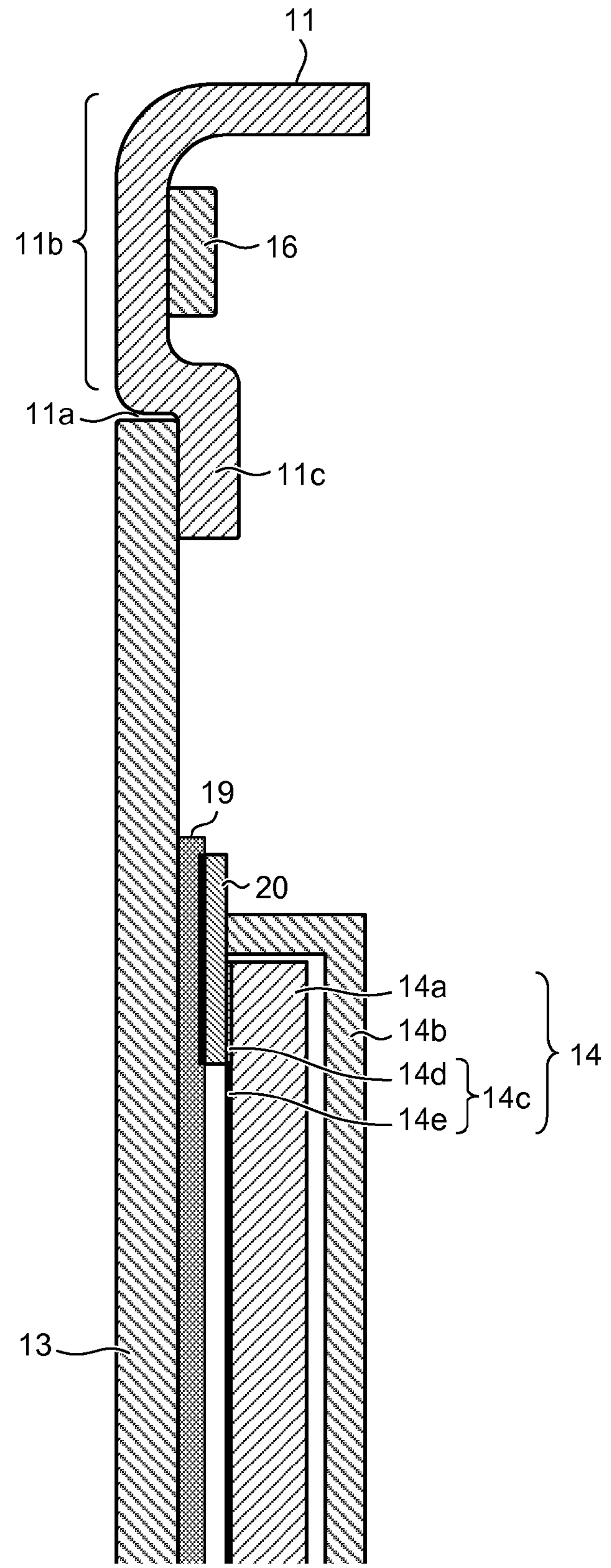
FIG. 6 is a cross-sectional view of a mobile phone according to a third embodiment.

The mobile phone 10 according to a third embodiment the present invention will be explained below with reference to FIG. 6. FIG. 6 is a cross-sectional view of the mobile phone according to the third embodiment. FIG. 6 is the cross-sectional view of the mobile phone according to the third embodiment when viewed from the same direction as that of the arrows in FIG. 1. Hereinafter, the explanation of the same portions as these of the first embodiment is omitted, and only portions different from the first embodiment will therefore be explained below.

As illustrated in FIG. 6, in the third embodiment, the piezoelectric element 16 is provided on the housing inner side of the flat plate portion 11*b* of the front case 11. The piezoelectric element 16 is provided at an end portion of the front case 11 in the long-side direction.

In the third embodiment, the front case 11 has a mount portion 11*c* where the end portion of the cover glass 13 is mounted. The mount portion 11*c* is extended from the flat plate portion 11*b*, to be located on the housing inner side of with respect to the flat plate portion 11*b*. A surface of the mount portion 11*c* where the end portion of the cover glass 13 is mounted is parallel to the flat plate portion 11*b*. The piezoelectric element 16 is arranged in a concave portion formed by the mount portion 11*c* and the side face portion of the front case 11.

Thus, in the third embodiment, the piezoelectric element 16 is provided to the front case 11. The front case 11 is formed of resin.

In the third embodiment, the piezoelectric element 16 is provided to the flat plate portion 11*b* of the front case 11 whose proportion occupied in the area of the front portion of the mobile phone 10 is small. Therefore, as compared with the case where the sound is transmitted to the user via, for example, the glass, the range in which the mobile phone 10 vibrates can be made narrow. Accordingly, the proportion of the vibration generated by the piezoelectric element 16 to be transmitted to an area around the user is small as compared with the proportion thereof being transmitted to the user via the ear cartilage or the like of the user. In other words, the possibility that the sound output from the mobile phone 10 may be heard by someone around can be reduced.

In the third embodiment, the piezoelectric element 16 is arranged at the end portion of the front case 11 in the long-side direction. Similar to the first embodiment, this position is near the position where the dynamic speaker is generally arranged in the mobile phone having the same structure as that of FIG. 1 and with the dynamic speaker. Therefore, upon listening to the sound on the mobile phone 10, the user has only to press the ear on the same position as the case when the user listens to the sound on the mobile phone with the dynamic speaker. This enables the user to listen to the sound on the mobile phone 10 without any discomfort.

Fourth Embodiment

Figure 7:
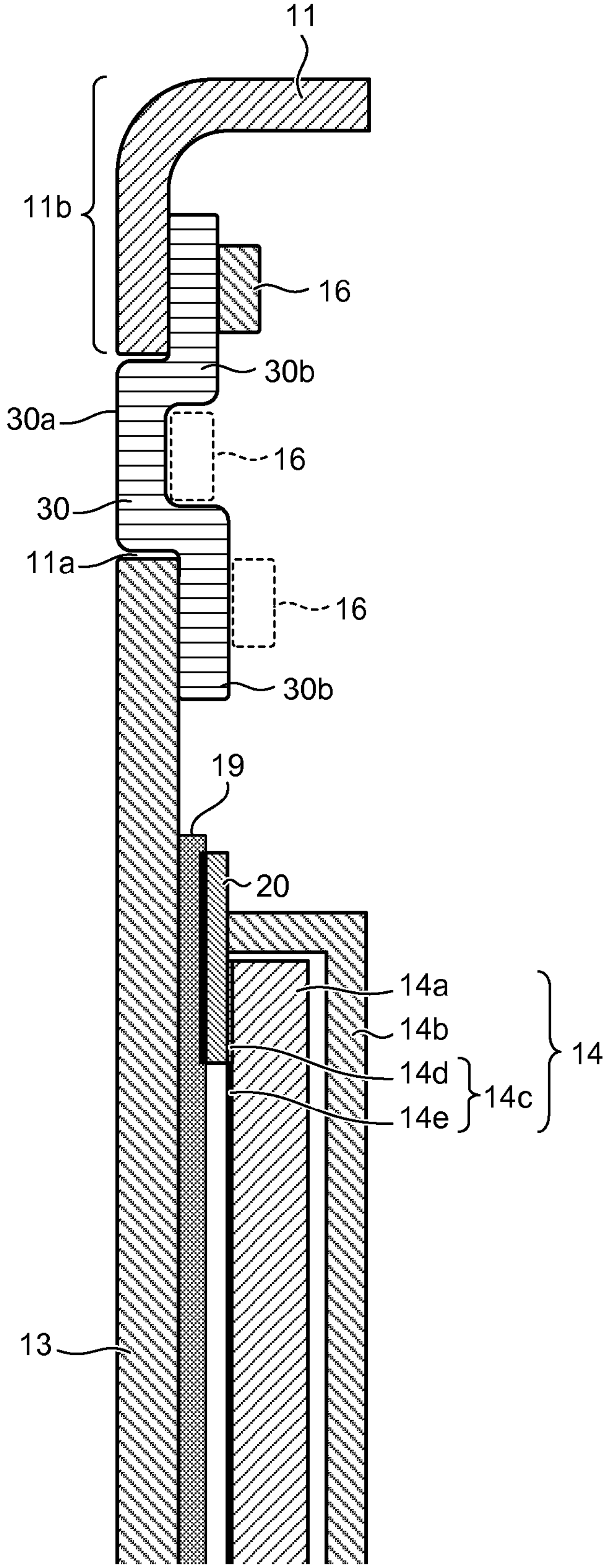
FIG. 7 is a cross-sectional view of a mobile phone according to a fourth embodiment.

The mobile phone 10 according to a fourth embodiment of the present invention will be explained below with reference to FIG. 7. FIG. 7 is a cross-sectional view of the mobile phone according to the fourth embodiment. FIG. 7 is the cross-sectional view of the mobile phone according to the fourth embodiment when viewed from the same direction as that of the III-III arrows in FIG. 1. Hereinafter, the explanation of the same portions as these of the first embodiment is omitted, and only portions different from the first embodiment will therefore be explained below.

As illustrated in FIG. 7, the mobile phone 10 according to the fourth embodiment has a decorative member 30. The decorative member 30 is formed of, for example, resin. The decorative member 30 is exposed to the outside of the housing through the opening 11*a*. A portion of the decorative member 30 exposed to the outside of the housing is formed to have shapes of characters, figures, or the like. The decorative member 30 may be a light guiding member that is formed of light transmissive resin and guides light emitted from a light-emitting element arranged in the mobile phone 10 to the outside of the housing.

The decorative member 30 has an exposed portion 30*a* exposed to the outside through the opening 11*a* and support portions 30*b* that extend from the exposed portion 30*a* and support the decorative member 30 inside the housing. An exposed surface of the exposed portion 30*a* is substantially flush with the planes of the flat plate portion 11*b* and the cover glass 13. The support portions 30*b* are provided in a manner extending from the exposed portion 30*a* respectively on the upper side and the lower side thereof along the long-side direction of the front case 11. An upper support portion 30*b* is fixed to the housing inner side of the flat plate portion 11*b*. A lower support portion 30*b* is fixed to the housing inner side of the cover glass 13.

As illustrated in FIG. 7, the piezoelectric element 16 is provided to the face on the housing inner side of the upper support portion 30*b* of the decorative member 30. The piezoelectric element 16 is provided to an area near the end portion of the front case 11 in the long-side direction.

Regardless of any material of which the decorative member 30 is formed, the piezoelectric element 16 is provided to the decorative member 30 which is a separate component from the front case 11, to thereby transmit the vibration generated by the piezoelectric element 16 to the user via the decorative member 30. This enables the range in which the mobile phone 10 vibrates to be reduced as compared with the case where the sound is transmitted to the user via, for example, the glass similar to the third embodiment. Thus, the proportion of the vibration generated by the piezoelectric element 16 to be transmitted to an area around the user is reduced as compared with the proportion that the vibration is transmitted to the user via the cartilage near the ear of the user. In other words, the possibility that the sound output from the mobile phone 10 may be heard by someone around can be reduced.

The piezoelectric element 16 may be provided at any one of the positions indicated by dotted line in FIG. 7. That is, the piezoelectric element 16 may be provided to the lower support portion 30*b*. Alternatively, the piezoelectric element 16 may be provided to the concave portion formed by the exposed portion 30*a* and the two support portions 30*b*. When the piezoelectric element 16 is provided to the concave portion, the space inside the housing can be effectively used as compared with the case where the piezoelectric element 16 is provided to the support portion 30*b*.

Fifth Embodiment

Figure 8:
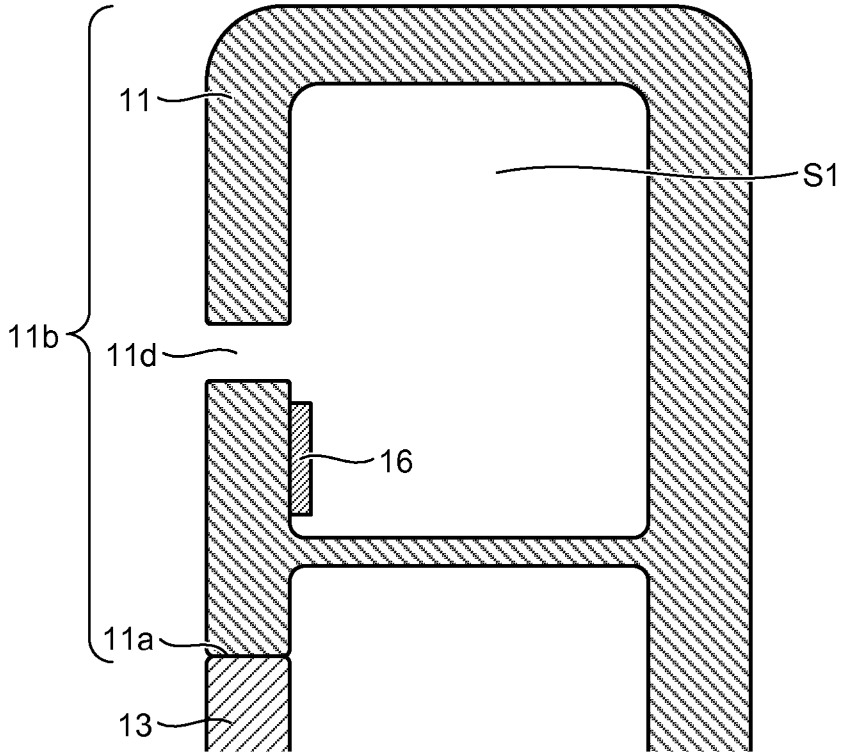
FIG. 8 is a cross-sectional view of a mobile phone according to a fifth embodiment.

The mobile phone 10 according to a fifth embodiment of the present invention will be explained below with reference to FIG. 8. FIG. 8 is a cross-sectional view of the mobile phone according to the fifth embodiment. FIG. 8 is the cross-sectional view of the mobile phone according to the fifth embodiment when viewed from the same direction as that of the III-III arrows in FIG. 1. Hereinafter, the explanation of the same portions as these of the first embodiment omitted, and only portions different from the first embodiment will therefore be explained below.

As illustrated in FIG. 8, the mobile phone 10 according to the fifth embodiment has a space S1 formed in its upper side. In addition, the flat plate portion 11*b* has an opening 11*d* formed on an end portion side of the opening 11*a* along the long-side direction of the front case 11. The space S1 communicates with the outside of the housing through the opening 11*d* formed on the flat plate portion 11*b*.

In the fifth embodiment, the piezoelectric element 16 is provided near the opening 11*d* on the housing inner side of the flat plate portion 11*b*. The piezoelectric element 16 vibrates an area near the opening 11*d* of the flat plate portion 11*b*. Furthermore, the vibration generated by the piezoelectric element 16 vibrates the air in the space S1, and the vibration of the air (i.e., sound wave) is transmitted to the outside of the housing through the opening 11*d*.

In the structure illustrated in FIG. 8, the area of the flat plate portion 11*b* where the piezoelectric element 16 is provided, the area of the opening 11*d*, and the volume of the space S1 are adjusted appropriately, and the vibration and the sound wave can thereby be cancelled each other in a predetermined frequency band. The vibration and the sound wave can be amplified in a predetermined frequency band based on a principle of superposition. Moreover, by adjusting the volume of the space S1 appropriately, sound pressure and sound quality of the sound wave can be adjusted.

For example, when the user does not bring the mobile phone 10 into contact with the cartilage near the ear, it is considered that there is such a usage in which the sound wave generated due to the vibration of the flat plate portion 11*b* and the sound wave transmitted from the opening 11*d* to the outside of the housing are cancelled each other to prevent someone around from hearing the sound output from the mobile phone 10.

However, when the user presses the cartilage near the ear on the flat plate portion 11*b*, the vibration of the flat plate portion 11*b* is transmitted to the user through the cartilage, and, in some cases, a sound wave passing through the opening 11*d* is generated and the generated sound wave may be transmitted to an eardrum through a hole of the ear. In this case, the sound wave passing through the opening 11*d* is not transmitted to an external space, and therefore cancelling or amplification of the sound waves in the predetermined frequency band is hard to occur.

In the fifth embodiment, when the piezoelectric element 16 is provided on the inner side of the housing that faces the opening 11*d*, for example, the sound wave transmitted from the opening 11*d* to the outside of the housing is transmitted, by diffraction, to a space that is outside of the housing and is situated on the right side of FIG. 8. Therefore, even when the piezoelectric element 16 is provided on the inner side of the housing that faces the opening 11*d*, for example, by adjusting the area of the opening 11*d* and the volume of the space S1 appropriately, the vibration and the sound wave can be cancelled each other in the predetermined frequency band. Moreover, the vibration and the sound wave can be amplified in the predetermined frequency band based on the principle of superposition.

Sixth Embodiment

Figure 9:
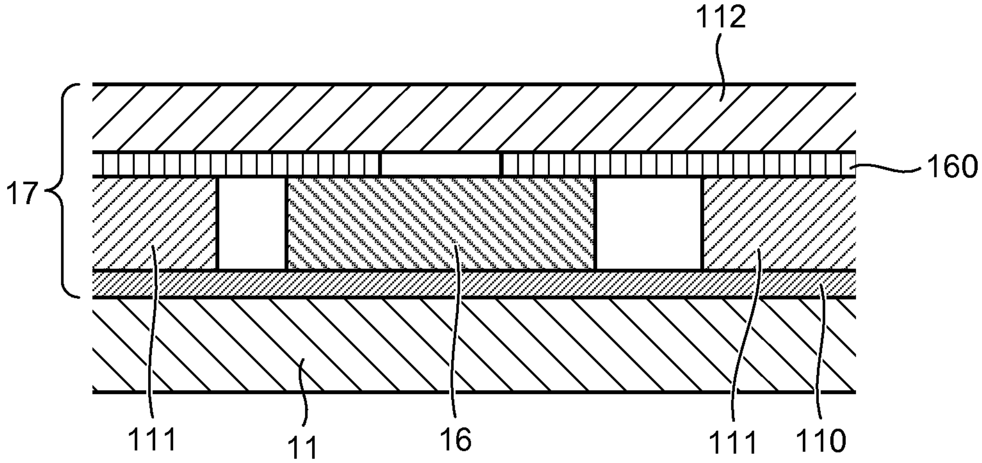
FIG. 9 is a cross-sectional view of a housing of a mobile phone according to a sixth embodiment.

The mobile phone 10 according to a sixth embodiment of the present invention will be explained below with reference to FIG. 9. FIG. 9 is a cross-sectional view of the front case 11 of the mobile phone according to the sixth embodiment. Hereinafter, the explanation of the same portions as these of the first embodiment is omitted, and only portions different from the first embodiment will therefore be explained below.

In the sixth embodiment, the substrate 17 is a multilayer substrate, which is formed of glass epoxy resin. The glass epoxy resin is formed by laminating a base material (glass fabric base material) formed of, for example, a glass fabric layer on top of another over the multilayer, impregnating the epoxy resin being thermosetting resin, and subjecting the impregnated epoxy resin to a heat treatment to be hardened.

As illustrated in FIG. 9, the substrate 17 is fixed to the front case 11, and includes a base layer 110, an intermediate layer 111, and a cover layer 112. The piezoelectric element 16 is provided between the base layer 110 and the cover layer 112. The piezoelectric element 16 is provided to a portion in which part of the intermediate layer 111 is not formed. The intermediate layer 111 plays a role of a spacer for providing the piezoelectric element 16 inside the front case 11. An electrode 160 is arranged between the intermediate layer 111 and the cover layer 112. The electrode 160 is coupled to the piezoelectric element 16. The electrode 160 which is an inner layer of the substrate 17 is coupled to a conductive line (not illustrated) to supply a power to the piezoelectric element 16.

In the sixth embodiment, the piezoelectric element 16 is provided inside the substrate 17. The substrate 17 is fixed to the front case 11. With this structure, the piezoelectric element 16 is arranged in a position near the outer surface of the front case 11, and therefore the vibration generated by the piezoelectric element 16 is appropriately transmitted to the user. As a result, the user can appropriately listen to the sound output from the mobile phone 10.

The piezoelectric element 16 is provided inside the substrate 17, and therefore a process of incorporating the piezoelectric element 16 inside the housing is not needed. Moreover, the space inside the housing can be efficiently used as compare with the case where the piezoelectric element 16 is arranged inside the housing.

In the sixth embodiment, the space is provided between the layers of the substrate 17 and the piezoelectric element 16 is provided inside the substrate 17. However, an embodiment in which at least part of the piezoelectric element 16 is embedded inside the housing can also be considered. For example, the piezoelectric element 16 may be embedded inside the front case 11 by insert molding. When the front case 11 is molded by two-color molding, it may be structured that the piezoelectric element 16 is put in a mold after a primary molding process, then a secondary molding process is performed, and the piezoelectric element 16 is thereby embedded inside the front case 11. According to this structure, the piezoelectric element 16 is arranged at a position near the outer surface of the front case 11, and therefore the vibration generated by the piezoelectric element 16 is appropriately transmitted to the user. As a result, the user can appropriately listen to the sound output from the mobile phone 10.

Seventh Embodiment

Figure 10:
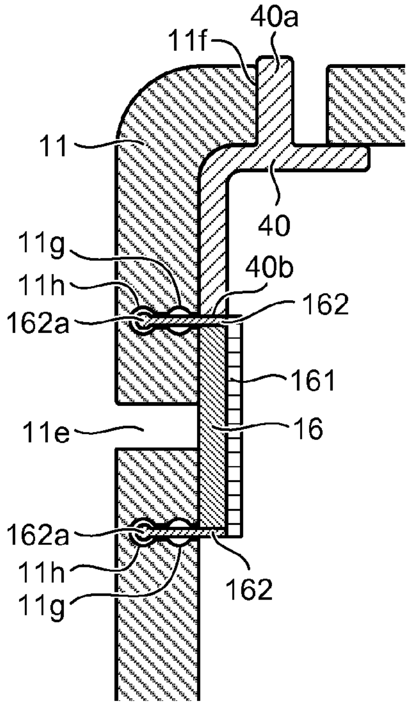
FIG. 10 is a cross-sectional view of a mobile phone according to a seventh embodiment.
Figure 11:
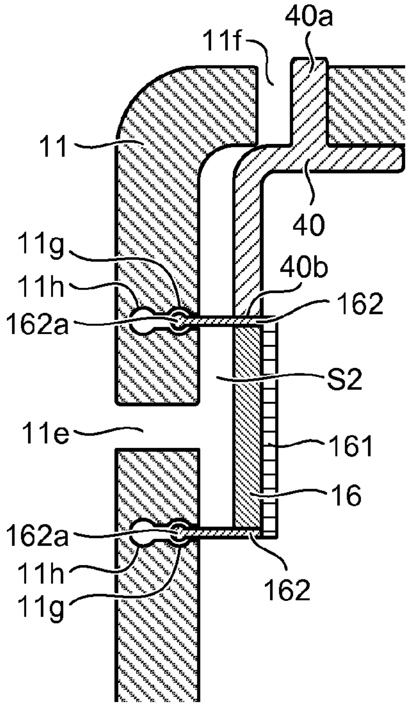
FIG. 11 is a cross-sectional view of the mobile phone according to the seventh embodiment.

The mobile phone 10 according to a seventh embodiment of the present invention will be explained below with reference to FIG. 10 and FIG. 11. FIG. 10 and FIG. 11 are cross-sectional views of the mobile phone according to the seventh embodiment. FIG. 10 and FIG. 11 are the cross-sectional views of the mobile phone according to the seventh embodiment when viewed from the same direction as that of the arrows in FIG. 1. Hereinafter, the explanation of the same portions as these of the first embodiment is omitted, and only portions different from the first embodiment will therefore be explained below.

As illustrated in FIG. 10 and FIG. 11, an opening 11*e* and an opening 11*f* are formed on the front case 11. The piezoelectric element 16 is arranged inside the opening 11*e*. A protrusion 40*a* of a switch 40, explained later, is arranged in the opening 11*f*. Holes 11*g* and 11*h* are formed on the front case 11. The cross section of the holes 11*g* and 11*h* is a circle, and the hole 11*h* is formed on the outer side of the housing with respect to the hole 11*g*. The holes 11*g* and 11*h* communicate with each other through a through hole. An engagement portion 162*a* of a leg portion 162, explained later, is inserted in the holes 11*g* and 11*h*.

A face on the housing inner side of the piezoelectric element 16 is fixed to a vibrating plate 161. The vibrating plate 161 has substantially the same size as that of the piezoelectric element 16, but its length in the long-side direction of the front case 11 is longer than the piezoelectric element 16. The leg portion 162 is provided at each end of the vibrating plate 161 along the long-side direction of the front case 11. The leg portion 162 protrudes from the vibrating plate 161 toward the housing in the thickness direction thereof. The engagement portion 162*a* is provided at the end of the leg portion 162. The cross section of the engagement portion 162*a* is substantially circle, and is inserted in the hole 11*g* or 11*h* formed on the front case to be engaged therein.

The mobile phone 10 according to the seventh embodiment has also the switch 40. The switch 40 has the protrusion 40*a* and an edge 40*b*. The protrusion 40*a* of the switch 40 is exposed to the outside of the housing through the opening 11*f* formed on the front case 11. An edge surface of the protrusion 40*a* protrudes more than the surface of the front case 11. The edge 40*b* is fixed to the upper leg portion 162.

The switch 40 moves the vibrating plate 161, as will be described now, between a first position in which the piezoelectric element 16 comes in contact with the front case 11 to vibrate the front case 11 and a second position which is on the inner side of the front case 11 than the first position and in which the sound generated by the vibrating plate 161 that vibrates together with the piezoelectric element 16 can be output from the opening 11*e*.

In the state illustrated in FIG. 10, the piezoelectric element 16 is in contact with the inner side of the front case 11. At this time, no space is formed between the piezoelectric element 16 and the inner side of the front case 11. In addition, the engagement portion 162*a* of the leg portion 162 is engaged in the hole 11*h*. Because the piezoelectric element 16 is in contact with the front case 11, when the piezoelectric element 16 vibrates, then the front case 11 in contact with the piezoelectric element 16 also vibrates. The user brings part of the front case 11 into contact with the cartilage near the ear in this state, and the vibration generated by the piezoelectric element 16 thereby reaches the user's body such as the ear cartilage via the front case 11. This enables the user to listen to the sound (vibration sound) made by the vibration output from the mobile phone 10.

Meanwhile, in the state illustrated in FIG. 11, as compared with the state illustrated in FIG. 10, the piezoelectric element 16, the vibrating plate 161, the leg portions 162, and the switch 40 are positioned on the inner side (right direction in the figure) along the thickness direction of the housing. At this time, a space S2 is formed between the piezoelectric element 16 and the inner face of the front case 11. In addition, the engagement portion 162*a* of the leg portion 162 is engaged in the hole 11*g*. In the state illustrated in FIG. 11, because the piezoelectric element 16 is apart from the front case 11, when the piezoelectric element 16 vibrates, then the vibrating plate 161 in contact with the piezoelectric element 16 vibrates. The piezoelectric element 16 and the vibrating plate 161 vibrate, which causes the air in the space S2 to vibrate, and the vibration as a sound wave is transmitted to the outside of the housing through the opening 11*e* formed on the front case 11.

The user moves the protrusion 40*a* of the switch 40 along the thickness direction of the housing (horizontal direction in the figure), so that the mobile phone 10 can be switched between the state illustrated in FIG. 10 and the state illustrated in FIG. 11. In other words, by operating the switch 40, the user can select the state illustrated in FIG. 10 when he/she wants to listen to the sound from the mobile phone 10 by the vibration sound, and can select the state illustrated in FIG. 11 when the user wants to listen to the sound from the mobile phone 10 in the similar manner to the case in which the dynamic speaker is used.

The mobile phones 10 according to the first to the seventh embodiments of the present invention has been explained so far with reference to the drawings. The mobile phone 10 according to each embodiment of the present invention has the piezoelectric element 16, and the piezoelectric element 16 transmits sound to the human body by the vibration sound, to allow the user to listen to sound and music. Therefore, the mobile phone 10 that transmits the sound using the piezoelectric element 16 does not need to form an opening for sound transmission on the housing, unlike the mobile phone that includes the dynamic speaker. Thus, waterproof and dustproof properties of the mobile phone 10 are ensured. Moreover, the mobile phone 10 according to each embodiment of the present invention transmits the sound to the human body by the vibration sound, and is therefore insulated from the influence of ambient sound.

The mobile phones 10 according to the first to the seventh embodiments of the present invention has been explained; however, the embodiment is not limited thereto. For example, in each of the embodiments, the mobile phone 10 does not have to have the touch sensor 15.

In each of the embodiments, the position where the piezoelectric element 16 is provided is not necessarily the position explained above as long as a portion of the mobile phone in contact with the cartilage near the user's ear can be vibrated. For example, in the first embodiment, the piezoelectric element 16 may be provided at an end portion of the cover glass 13 in the horizontal direction.

In the seventh embodiment, the mechanism for moving the piezoelectric element is not limited to the switch 40 illustrated in FIG. 10 and FIG. 11. It could be any mechanism as long as the piezoelectric element can be moved between a position where the piezoelectric element is in close contact with the front case and a position where a space is formed between the piezoelectric element and the front case.

The mobile phone 10 has a control unit including a processor. The control unit applies a predetermined electrical signal (voltage according to a sound signal) to the piezoelectric element 16. The voltage that the control unit applies to the piezoelectric element 16 may be, for example, ±15 V which is higher than ±5 V being a voltage applied to a so-called panel speaker in order for sound transmission using air-conducted sound instead of vibration sound. As a result, even if the user presses a vibrating panel (e.g., cover glass 13) against his/her own body with a force of, for example, 3 N or more (force of 5 N to 10 N), it is possible to generate sufficient vibration in the panel and generate vibration sound via part of the user's body. How much applied voltage is to be used can be adjusted appropriately according to fixing strength with respect to the housing of the panel or the support member or according to performance of the piezoelectric element 16. When the control unit applies the electrical signal to the piezoelectric element 16, the piezoelectric element 16 elongates/contracts or bends in the long-side direction. At this time, the panel provided with the piezoelectric element 16 deforms according to the elongation/contraction or the bending of the piezoelectric element 16, and the panel vibrates. Therefore, the panel generates air-conducted sound and also generates, when the user presses part of his/her body (e.g., external ear cartilage) on the panel, vibration sound via the part of the body. For example, the control unit can apply the electrical signal corresponding to the sound signal according to the voice of the other person on the phone to the piezoelectric element 16, and generate the air-conducted sound and the vibration sound corresponding to the sound signal. The sound signal may be those according to a ring tone or to musical composition including music, and the like. The sound signal according to the electrical signal may be those based on music data stored in an internal memory of the electronic device or may be those in which music data stored in an external server or the like is reproduced via a network.

The panel (e.g., cover glass 13) preferably vibrates not only an attachment area where the piezoelectric element 16 is attached but also an area apart from the attachment area. The panel has a plurality of locations that vibrate in a direction of intersecting with a principal surface of the panel in the vibrating area, and a value of amplitude of the vibration changes from a plus value to a minus value with time or changes inversely in each of the locations. The panel vibrates in such a manner that a portion in which amplitude of the vibration is relatively large and a portion in which amplitude of the vibration is relatively small are distributed randomly or periodically over a seemingly and substantially whole panel at a certain moment. In other words, vibrations of a plurality of waves are detected over the whole panel. In order not to damp the vibrations on the panel even if the user presses the panel against his/her own body with a force of, for example, 5 N to 10 N, the voltage that the control unit applies to the piezoelectric element 16 may be ±15 V. Therefore, the user can listen to the sound by pressing the ear on an area away from the attachment area of the panel.

Figure 12:
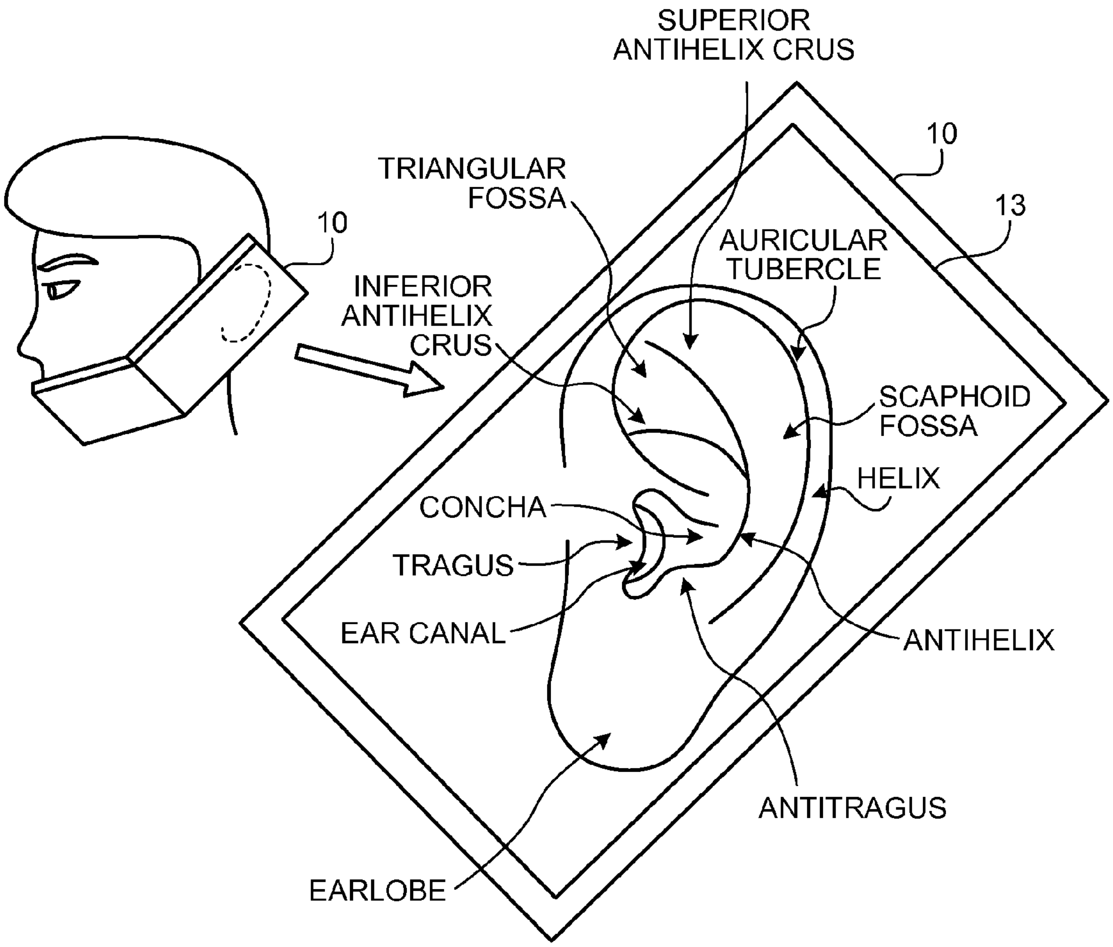
FIG. 12 is a schematic diagram illustrating a relation between a mobile phone according to a modification of the present invention and a human ear.

The panel (e.g., cover glass 13) may be substantially the same size as that of the user's ear. The panel may be larger in size than the user's ear, as illustrated in FIG. 12. In this case, when the user listens to the sound, an entire ear is easily covered with the panel of the mobile phone 10, and therefore ambient sound (noise) can be made hard to enter an ear canal. The panel has only to vibrate in an area wider than an area having a length corresponding to a distance from inferior crus of antihelix (inferior antihelix crus) to antitragus and a width corresponding to a distance from tragus to the antihelix. The panel is preferably structured so that an area having a length corresponding to a distance from a site near superior crus of antihelix (superior antihelix crus) in helix to earlobe and a width corresponding to a distance from the tragus to a site near the antihelix in the helix vibrates. The area having the length and the width may be a rectangular area, or may be an elliptical area in which the length is its major axis and the width is its minor axis. An average ear size of Japanese can be learned by referring to Japanese Body Size Database (1992 to 1994) created by Research Institute of Human Engineering for Quality Life (HQL), or the like. If the panel is larger than the average ear size of Japanese, then the panel is considered substantially large enough to cover entire ears of people in other countries.

The mobile phone 10 is capable of transmitting the air-conducted sound and the human-body vibration sound via part of the user's body (e.g., external ear cartilage) to the user by the vibration of the panel. Therefore, when a sound of the volume equivalent to that of a conventional dynamic receiver is to be output, less sound is transmitted by air vibration due to the vibration of the panel to an area around the mobile phone 10 as compared with that of the dynamic receiver. Therefore, it is suitable for the case in which the user listens to, for example, a recorded message on trains and the like.

In addition, because the mobile phone 10 transmits the human-body vibration sound by the vibration of the panel, even if the user wears an earphone or a headphone, the user can listen to the sound via the earphone or the headphone and part of the body by contacting the mobile phone 10 therewith.

The mobile phone 10 transmits the sound to the user by the vibration of the panel. Therefore, when the mobile phone 10 has no separate dynamic receiver, there is no need to form an opening (sound releasing port) for sound transmission, thus simplifying a waterproof structure of the mobile phone 10. When the mobile phone 10 has a dynamic receiver, the sound releasing port is preferably sealed by an air-permeable but liquid non-permeable member. The air-permeable but liquid non-permeable member is, for example, GORE-TEX®.

Figure 13:
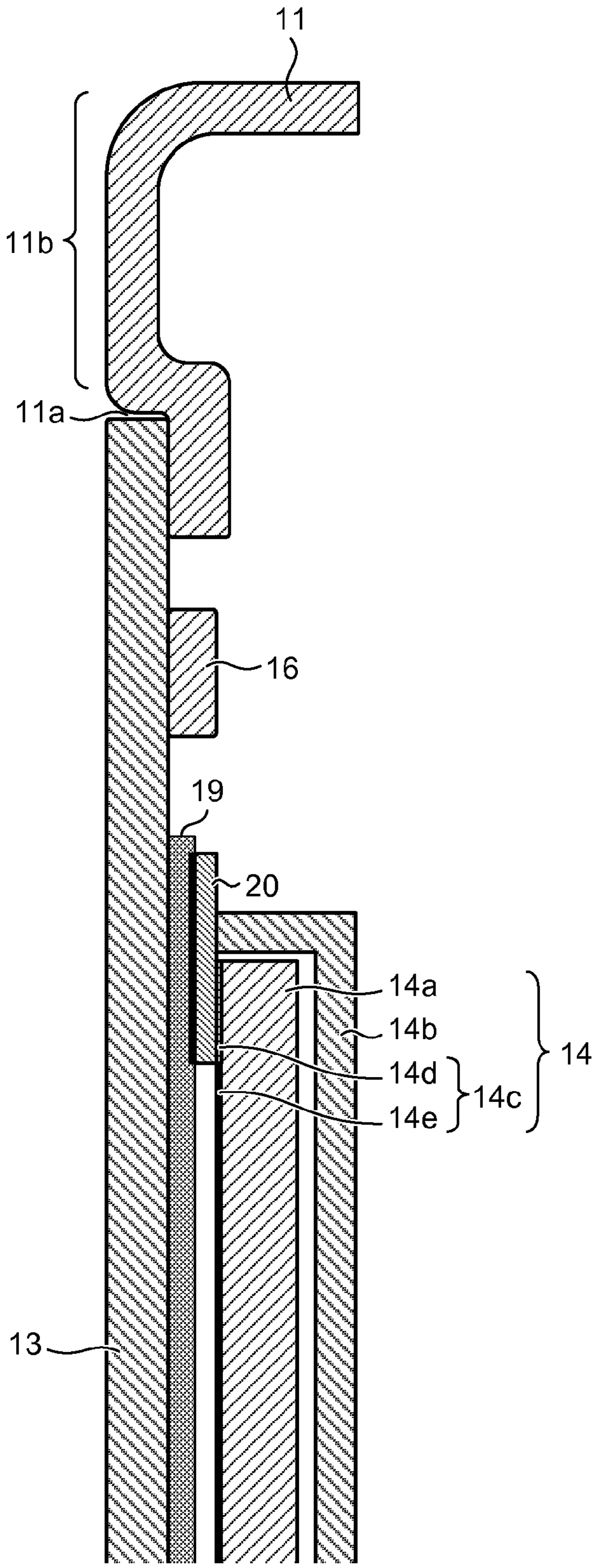
FIG. 13 is a cross-sectional view of a mobile phone according to another modification of the present invention.

An example of a mobile phone without the touch sensor 15 will be explained below with reference to FIG. 13. FIG. 13 is a cross-sectional view of the mobile phone when viewed from the same direction as that of the arrows in FIG. 1. In the mobile phone illustrated in FIG. 13, the elastic member 19, the double-sided tape 20, and the display unit 14 are laminated in this order along the lamination direction from the cover glass 13. The piezoelectric element 16 is fixed to a portion where the elastic member 19 is not provided within the face on the housing inner side of the cover glass 13. The piezoelectric element 16 transmits the vibration of the piezoelectric element generated using the mechanical natural resonance phenomenon to the cover glass 13 to vibrate the cover glass 13. FIG. 13 represents an example that the piezoelectric element 16 is fixed to the cover glass 13; however, the piezoelectric element 16 may be fixed to any other portion as explained in the second to the seventh embodiments.

The piezoelectric element used for the mobile phone 10 may be a bimorph type, a mono-morph type, or a unimorph type of a flat plate made of, for example, lead zirconate titanate (PZT). If it is the bimorph type, a bimorph in which ceramics having about 10 layers to 30 layers and a parallel plate electrode are alternately laminated on top of another is preferably used.

The invention claimed is:

1. A mobile electronic device, comprising:

a housing;

a piezoelectric element;

an opening formed provided in the housing;

a cover member fitted in the opening; and a display unit arranged inside of the housing so that a display area is visible from outside of the housing through the cover member, wherein the piezoelectric element is configured to vibrate a portion in contact with a user in the mobile electronic device and transmit vibration sound to the user, and the piezoelectric element is attached to the cover member.

2. The mobile electronic device according to claim 1, further comprising a touch panel laminated between the cover member and the display unit.

3. A mobile electronic device, comprising:

a housing;

a piezoelectric element;

an opening formed provided in the housing; and a display unit arranged inside of the housing so that a display area is visible from outside of the housing through the opening, wherein the piezoelectric element is configured to vibrate a portion in contact with a user in the mobile electronic device and transmit vibration sound to the user, and the piezoelectric element is attached to the display unit.

4. The mobile electronic device according to claim 3, further comprising a touch panel that faces the display area of the display unit and is laminated on an outer side thereof in the housing.

5. A mobile electronic device, comprising:

a housing;

a piezoelectric element;

an opening formed provided in the housing; and a decorative member that is extended from inside of the housing to outside of the housing through the opening, wherein the piezoelectric element is configured to vibrate a portion in contact with a user in the mobile electronic device and transmit vibration sound to the user, and the piezoelectric element is attached to the decorative member.

6. A mobile electronic device, comprising:

a housing; and a piezoelectric element, wherein the piezoelectric element is configured to vibrate a portion in contact with a user in the mobile electronic device and transmit vibration sound to the user, the piezoelectric element is fixed to an inner face of the housing, the housing has a substantially rectangular flat plate portion, and the piezoelectric element is a bar shape, and is arranged so that a long-side direction thereof is along a short-side direction of the flat plate portion and so that a center thereof in the long-side direction coincides with a center in the short-side direction of the flat plate portion.

7. A mobile electronic device, comprising:

a housing;

a piezoelectric element;

a circuit substrate arranged inside of the housing, the circuit substrate being a multilayer substrate that includes an electrode layer inside of the circuit substrate, wherein the piezoelectric element is configured to vibrate a portion in contact with a user in the mobile electronic device and transmit vibration sound to the user, the piezoelectric element is provided inside of the multilayer substrate, and the electrode layer is electrically coupled to the piezoelectric element.

8. A mobile electronic device, comprising:

a housing; and a piezoelectric element, wherein the piezoelectric element is configured to vibrate a portion in contact with a user in the mobile electronic device and transmit vibration sound to the user, the housing is formed of resin, and the piezoelectric element is embedded in the housing by insert molding.

9. A mobile electronic device, comprising:

a housing; and a piezoelectric element, wherein the piezoelectric element is configured to vibrate a portion in contact with a user in the mobile electronic device and transmit vibration sound to the user, the housing has an opening formed therein, the piezoelectric element is arranged near the opening, and a first sound transmitted from the vibrating housing to the user and a second sound, that is generated by the vibration of the piezoelectric element and is transmitted to the user through the opening, cancel each other in a proportion according to a frequency band.

10. A mobile electronic device, comprising:

a housing; and a piezoelectric element, the piezoelectric element is configured to vibrate a portion in contact with a user in the mobile electronic device and transmit vibration sound to the user, the piezoelectric element is fixed to an inner face of the housing, the housing has an opening formed therein, and at least part of a frequency component of a first sound generated in a portion of the housing vibrated by the piezoelectric element in contact with the user is reduced by a second sound generated inside of the housing by the vibration of the piezoelectric element and output from the opening.

11. A mobile electronic device, comprising:

a housing; and a piezoelectric element, wherein the piezoelectric element is configured to vibrate a portion in contact with a user in the mobile electronic device and transmit vibration sound to the user, and an area where, upon contact with a body of the user, the vibration sound is transmittable to the body of the user, is same as an ear of the user or is larger than the ear.

12. The mobile electronic device according to claim 11, wherein said portion vibrated by the piezoelectric element is arranged in the mobile electronic device at a position where said portion is contactable with an earphone or a headphone worn by the user.

13. The mobile electronic device according to claim 11, wherein the area has (i) a length corresponding to a distance from an inferior crus of an antihelix of the ear to an antitragus of the ear and (ii) a width corresponding to a distance from a tragus of the ear to the antihelix of the ear.

14. The mobile electronic device according to claim 11, wherein the area has (i) a length corresponding to a distance from a site near a superior crus of an antihelix in a helix of the ear to an earlobe of the ear and (ii) a width corresponding to a distance from a tragus of the ear to a site near the antihelix in the helix of the ear.

15. A mobile electronic device, comprising:

a housing; and a piezoelectric element, wherein the piezoelectric element is configured to vibrate a portion in contact with a user in the mobile electronic device and transmit air-conducted sound and vibration sound to the user, the housing has an opening formed therein, the piezoelectric element is arranged near the opening, and a first sound transmitted from the vibrating housing to the user and a second sound, that is generated by the vibration of the piezoelectric element and is transmitted to the user through the opening, cancel each other in a proportion according to a frequency band.

* * * * *